March 4, 1952 H. I. LIBBY 2,588,020
AIRPLANE CONTROL
Filed Oct. 25, 1949
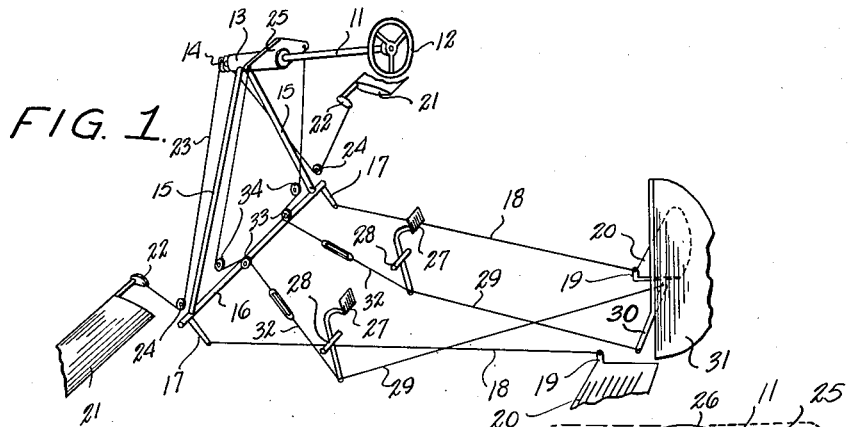
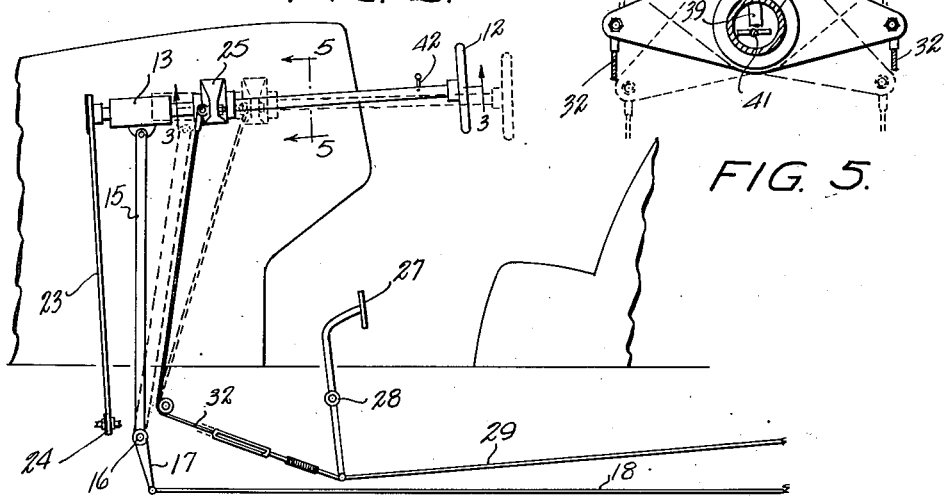
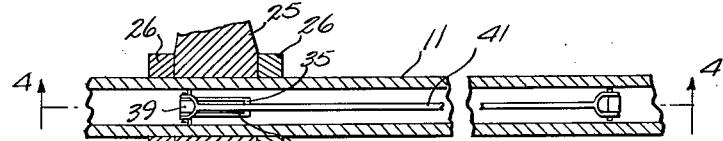
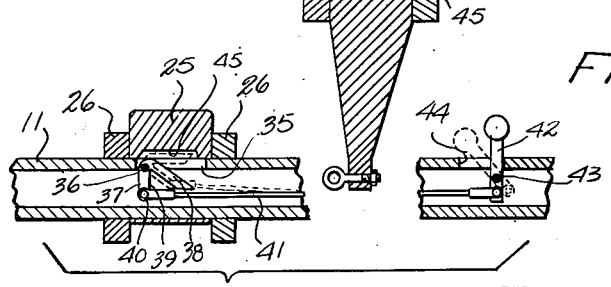
INVENTOR
HENRY I. LIBBY,
BY McMorrow, Berman & Davidson
ATTORNEYS Patented Mar. 4, 1952

2,588,020

UNITED STATES PATENT OFFICE 2,588,020

AIRPLANE CONTROL

Henry I. Libby, Hampden, Mass.

Application October 25, 1949, Serial No. 123,498

1 Claim. (Cl. 244—83)

This invention relates to aircraft of the heavier-than-air type, and more particularly to control systems therefor.

A main object of the invention is to provide an improved control system for airplanes of the type wherein normal coordinating relation between the rudder and aileron systems may be at times disengaged, the system being very simple in construction, reliable in operation, and involving only a few parts.

A further object of the invention is to provide an improved airplane-control system wherein the rudder system and aileron system may be independently operated, and wherein means is provided for coordinating the rudder and aileron systems at times, whereby the two systems may be operated automatically in coordination on movement of either the rudder or aileron control, or may be disengaged for separate and independent operation.

Further objects and advantages of the invention will become apparent from the following description and claims, and from the accompanying drawings, wherein:

Figure 1 is a perspective schematic diagram illustrating an improved airplane-control system constructed in accordance with the present invention;

Figure 2 is an enlarged fragmentary view of a portion of the system of Figure 1, said view being taken in side elevation, and showing the control wheel and its shaft and the various elements associated with said shaft;

Figure 3 is an enlarged fragmentary cross-sectional detail view taken on line 3—3 of Figure 2;

Figure 4 is a fragmentary cross-sectional detail view taken on line 4—4 of Figure 3;

Figure 5 is an enlarged transverse vertical cross-sectional view taken on line 5—5 of Figure 2.

Referring to the drawings, 11 designates a hollow shaft carrying the steering wheel 12 and being rotatably supported in a sleeve member 13 and carrying rigidly secured to its end portion a pulley 14. Sleeve member 13 is connected by inclined struts 15, 15 to a transverse shaft 16 rotatably mounted by means, not shown, in the body of the aircraft. Shaft 16 has secured thereto respective arms 17, 17 whose ends are connected by cables 18, 18 to upstanding lugs 19 carried by the corner portions of the respective elevators 20, 20 of the aircraft. The elevators 20, 20 are, therefore, operated by moving the steering wheel 12 forwardly or rearwardly. The ailerons, shown at 21, 21 are provided with operating levers 22, 22 whose ends are connected by a cable 23 extending around idler pulleys 24 and around the pulley 14, as shown in Figures 1 and 2. The ailerons 21, 21 are, therefore, operated by rotating steering wheel 12.

Designated at 25 is a cross-arm member rotatably mounted on shaft 11 and held against longitudinal movement on said shaft by opposing washers 26, 26 rigidly secured on the shaft. Designated at 27, 27 are respective foot pedals rotatably mounted by means, not shown, on transverse shafts 28, 28 in the body of the aircraft, the ends of said foot pedals being connected by cables 29, 29 to the respective ends of a cross-bar 30 rigidly secured to the rudder 31. The rudder, therefore, is operated by pushing downwardly on one or the other of the foot pedals 27, 27. The ends of the respective pedals 27, 27 are connected by respective cables 32, 32 passing around idler pulleys 33 and 34 to the respective ends of the cross-bar 25. The shaft member 11 is formed in its top wall beneath the cross-bar 25 with a longitudinal slot 35, and pivoted at 36 in the forward end of slot 35 is a lever 37 of inverted V-shape having an upper arm 38 and a lower arm 39. Pivotally secured at 40 to the end of lower arm 39 is the bifurcated end of a rod 41 which extends through the hollow shaft 11 and is pivotally connected at its opposite end to the lower end of a hand lever 42 pivoted on a transverse pin 43 in shaft 11 and extending upwardly through a slot 44 in the top wall portion of shaft 11. The bottom surface of cross-arm 25 is formed with a groove 45 located above the slot 35. By rotating lever 42 from the full line position to the dotted line position shown in Figure 4, the arm 38 may be rotated from its full line position to its dotted line position, wherein said arm 38 is nestingly received in the groove 45. This locks the cross-arm 25 to the shaft 11. In the locked position of cross-arm 25, the rudder-control cross-bar 30 is connected to the cables 29 and 32 and through the cross-bar 25 to the shaft 11, whereby said rudder cross-bar 30 may be rotated by rotating wheel 12. This places the rudder 31 and the ailerons 21, 21 under coordinated control by the steering wheel 12. The same control is provided by the foot pedals 27, 27. The aircraft may, therefore, be steered either by operating the steering wheel 12, leaving the legs free, or by operating the pedals 27, 27, leaving the hands free. Vertical control of the aircraft is effected, as in ordinary usage, by pushing the hand wheel 12 forwardly or rearwardly, thereby operating the elevators 20, 20.

When it is desired to control the rudder 31 and the ailerons 21, 21 independently of each other, the hand lever 42 is placed in the full line position shown in Figure 4, thereby disengaging arms 38 from groove 45 and unlocking cross-bar 25 with respect to shaft 11.

The arm 38 and the groove 45 are preferably made upwardly tapering in cross-sectional shape to facilitate disengagement of the arm 38 from groove 45 when the operating lever 42 is moved from its dotted line position to its full line position of Figure 4.

While a specific embodiment of a control system for aircraft has been disclosed in the foregoing description, it is to be understood that various modifications within the spirit of the invention may occur to those skilled in the art. Therefore, it is intended that no limitations be placed on the invention except as defined by the scope of the appended claim.

What is claimed is:

In an aircraft having a rudder system and an aileron system, a hand actuated hollow shaft rotatably supported within said aircraft, means operatively connecting said hollow shaft and aileron system for actuating the latter in response to the rotary movement of the former, a foot actuable mechanism pivotally supported within said aircraft, means operatively connecting said actuable mechanism and said rudder system for actuating the latter in response to the pivotal movement of the former, and means operatively connected to said shaft and said mechanism for selectively coordinating the control of said rudder and aileron systems for actuation in response to the movement of either said shaft or said mechanism, said last named means comprising a cross bar circumposed about said hollow shaft and rotatably supported on the latter, cable means connecting said cross bar to said foot actuable mechanism, a keeper disposed interiorly of said hollow shaft and movable transversely therethrough into and out of engagement with said cross bar for locking the latter against rotation on said shaft to thereby coordinate the control of said rudder and aileron systems, and means operatively connected to said keeper for selectively effecting the movement of the latter into engagement with said cross bar, said last named means comprising a hand lever pivotally supported intermediate its ends on said hollow shaft and having one end projecting exteriorly of the latter and having the other end extending into said shaft, and a rod operatively connected between said other end of said lever and said keeper.

HENRY I. LIBBY.

REFERENCES CITED

The following references are of record in the file of this patent:

UNITED STATES PATENTS

| Number | Name | Date |
|---|---|---|
| 2,071,991 | Varkas | Feb. 23, 1937 |
| 2,442,289 | Garehime | May 25, 1948 |